(12) United States Patent
Chang

(10) Patent No.: US 12,689,206 B2
(45) Date of Patent: Jul. 21, 2026

(54) UNDERVOLTAGE-LOCKOUT CIRCUIT WITH LOW POWER CONSUMPTION

(71) Applicant: Kang-Shuo Chang, New Taipei City (TW)

(72) Inventor: Kang-Shuo Chang, New Taipei City (TW)

(73) Assignee: iSentek Inc., New Taipei City (TW)

( * ) Notice: Subject to any disclaimer, the term of this patent is extended or adjusted under 35 U.S.C. 154(b) by 261 days.

(21) Appl. No.: 18/432,091

(22) Filed: Feb. 5, 2024

(65) Prior Publication Data

US 2025/0219390 A1 Jul. 3, 2025

(30) Foreign Application Priority Data

Dec. 29, 2023 (TW) ................................. 112151498

(51) Int. Cl.
H02H 3/24 (2006.01)
H02M 7/537 (2006.01)

(52) U.S. Cl.
CPC .............. H02H 3/24 (2013.01); H02M 7/537 (2013.01)

(58) Field of Classification Search
CPC ............ H02H 3/24; H02H 3/243; H02H 3/02; H02M 7/537
See application file for complete search history.

(56) References Cited

U.S. PATENT DOCUMENTS

| | | | | |
|---|---|---|---|---|
| 2006/0091940 A1* | 5/2006 | Kimura | .................. | G05F 3/262 |
| | | | | 327/543 |
| 2011/0316449 A1 | 12/2011 | Imanaka | | |
| 2013/0342947 A1* | 12/2013 | Sugahara | ......... | G01R 19/16576 |
| | | | | 361/92 |

(Continued)

FOREIGN PATENT DOCUMENTS

| | | |
|---|---|---|
| CN | 102790519 | 11/2012 |
| CN | 211830191 | 10/2020 |

(Continued)

OTHER PUBLICATIONS

"Office Action of Taiwan Counterpart Application", issued on Oct. 11, 2024, p. 1-p. 5.

*Primary Examiner* — Monica Lewis
*Assistant Examiner* — Nicolas Bellido
(74) *Attorney, Agent, or Firm* — JCIPRNET

(57) ABSTRACT
An undervoltage-lockout circuit is provided. The undervoltage-lockout circuit includes a current mirror circuit, a current source, a first reference transistor, a second reference transistor, and a comparison circuit. The current mirror circuit includes a first connection terminal and a second connection terminal. The current source is coupled to the first connection terminal. A first terminal of the first reference transistor is coupled to the second connection terminal. A second terminal of the first reference transistor provides a reference voltage. A first terminal of the second reference transistor is coupled to the second terminal of the first reference transistor. A second terminal of the second refer- (Continued)

100 ence transistor is coupled to a system low voltage. The comparison circuit receives an input voltage at the first connection terminal and the reference voltage. The comparison circuit generates an undervoltage-lockout signal according to the input voltage and the reference voltage.

10 Claims, 5 Drawing Sheets

(56) References Cited

U.S. PATENT DOCUMENTS

| | | | | |
|---|---|---|---|---|
| 2014/0146429 A1* | 5/2014 | Lee | ........................ | H02H 3/243 |
| | | | | 361/86 |
| 2016/0248406 A1* | 8/2016 | Kadowaki | ............ | H03K 5/2481 |
| 2017/0012619 A1* | 1/2017 | Song | ........................ | G06F 1/24 |

FOREIGN PATENT DOCUMENTS

| | | | | | |
|---|---|---|---|---|---|
| CN | 211830191 U | * | 10/2020 | | |
| CN | 116301171 A | * | 6/2023 | ............. | G05F 1/567 |
| TW | 200939603 | | 9/2009 | | |

* cited by examiner

UNDERVOLTAGE-LOCKOUT CIRCUIT WITH LOW POWER CONSUMPTION

CROSS-REFERENCE TO RELATED APPLICATION

This application claims the priority benefit of Taiwan application no. 112151498, filed on Dec. 29, 2023. The entirety of the above-mentioned patent application is hereby incorporated by reference herein and made a part of this specification.

BACKGROUND

Technical Field

The disclosure relates to an electronic circuit, and in particular to an undervoltage-lockout (UVLO) circuit.

Description of Related Art

FIG. 1 is a schematic circuit diagram of a conventional undervoltage-lockout circuit for an electronic circuit. An undervoltage-lockout circuit 10 can determine whether to stop an operation of an electronic circuit according to a voltage value of a system high voltage VDD. The undervoltage-lockout circuit 10 includes resistors R1, R2, and R3, a transistor MP, a comparator CP, and an inverter IVT. The undervoltage-lockout circuit 10 divides the system high voltage VDD by the resistors R1, R2, and R3 and the transistor MP to generate an input voltage VB. The comparator CP compares the input voltage VB with a reference voltage VREF. When a voltage value of the input voltage VB is higher than a voltage value of the reference voltage VREF, the comparator CP provides a signal with a low voltage level. Therefore, the inverter IVT provides an undervoltage-lockout signal VOUT with a high voltage level. The undervoltage-lockout signal VOUT with the high voltage level enables the electronic circuit to continue operating. At this time, the transistor MP is turned on. Therefore, the resistor R1 is bypassed, and the voltage value of the input voltage VB is increased.

When the voltage value of the input voltage VB is lower than the voltage value of the reference voltage VREF, the comparator CP provides a signal with a high voltage level. Therefore, the inverter IVT provides an undervoltage-lockout signal VOUT with a low voltage level. The undervoltage-lockout signal VOUT with the low voltage level stops the electronic circuit from operating. At this time, the transistor MP is turned off. Therefore, the resistor R1 is not bypassed, and the voltage value of the input voltage VB is reduced. The transistor MP provides a hysteresis function.

However, the undervoltage-lockout circuit 10 divides the system high voltage VDD by the resistors R1, R2, and R3. Therefore, the undervoltage-lockout circuit 10 has a large power consumption. To reduce the power consumption of the undervoltage-lockout circuit 10, resistance values of resistors R1, R2, and R3 need to be increased. Therefore, the layout area of resistors R1, R2, and R3 is greatly increased. Therefore, how to provide an undervoltage-lockout circuit with low power consumption and a small layout area is one of the issues for research undertaken by those skilled in the art.

SUMMARY

The disclosure provides an undervoltage-lockout circuit with low power consumption and a small layout area.

An undervoltage-lockout circuit of the disclosure includes a current mirror circuit, a current source, a first reference transistor, a second reference transistor, and a comparison circuit. The current mirror circuit is coupled to a system high voltage. The current mirror circuit includes a first connection terminal and a second connection terminal. The current source is coupled to the first connection terminal. A first terminal of the first reference transistor is coupled to the second connection terminal. A second terminal of the first reference transistor provides a reference voltage. A first terminal of the second reference transistor is coupled to the second terminal of the first reference transistor. A second terminal of the second reference transistor is coupled to a system low voltage. The comparison circuit is coupled to the second terminal of the first reference transistor and the first connection terminal. The comparison circuit receives an input voltage at the first connection terminal and the reference voltage. The comparison circuit generates an undervoltage-lockout signal according to the input voltage and the reference voltage.

Based on the above, the undervoltage-lockout circuit generates the undervoltage-lockout signal according to the input voltage located at the first connection terminal and the reference voltage located at the second terminal of the first reference transistor. It should be noted that the disclosure provides the input voltage corresponding to the system high voltage by the current mirror circuit and the current source. Therefore, the undervoltage-lockout circuit does not need to divide the system high voltage by multiple resistors to generate the input voltage. In this way, the layout area and power consumption of the undervoltage-lockout circuit may be greatly reduced.

DESCRIPTION OF THE EMBODIMENTS

Figure 1:
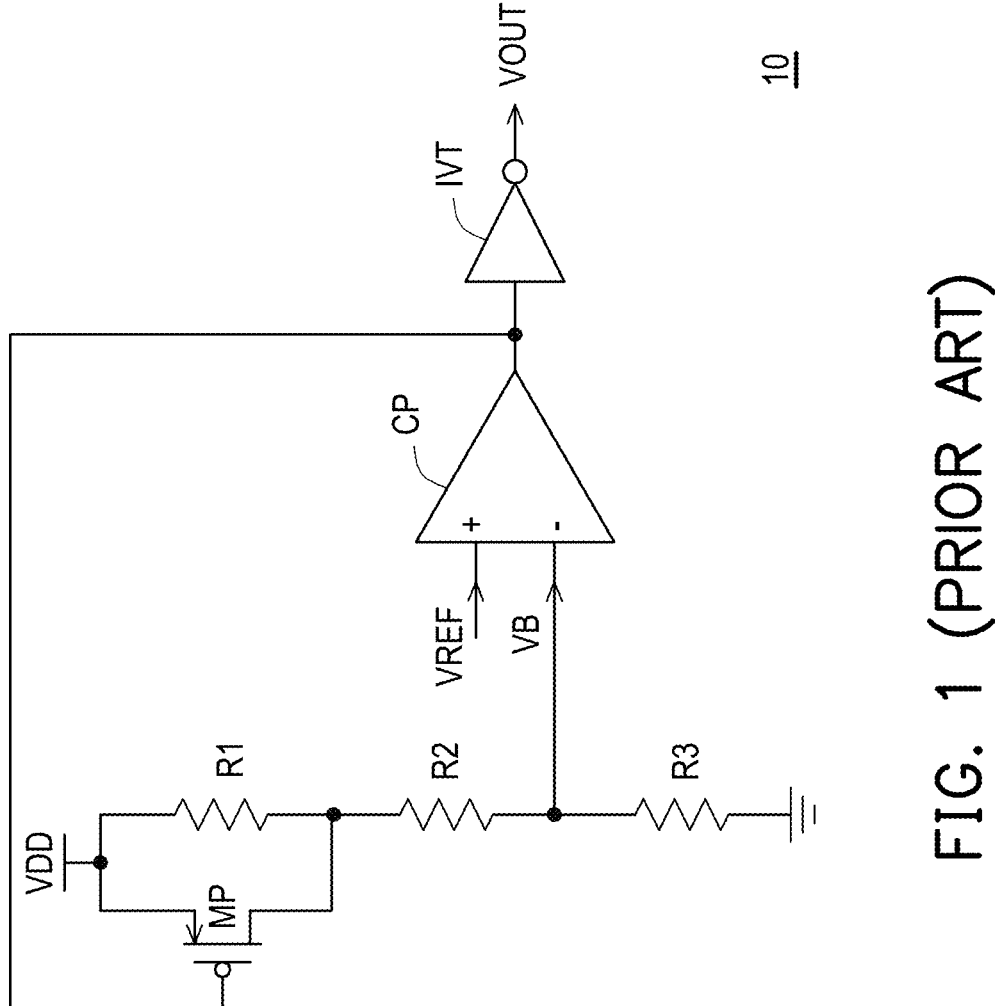
FIG. 1 is a schematic circuit diagram of a conventional undervoltage-lockout circuit.

Some embodiments of the disclosure accompanied with drawings are described in detail as follows. The reference numerals used in the following description are regarded as the same or similar elements when the same reference numerals appear in different drawings. These embodiments are only a part of the disclosure, and do not disclose all the possible implementation modes of the disclosure. To be more precise, the embodiments are only examples in the scope of the claims of the disclosure.

Figure 2:
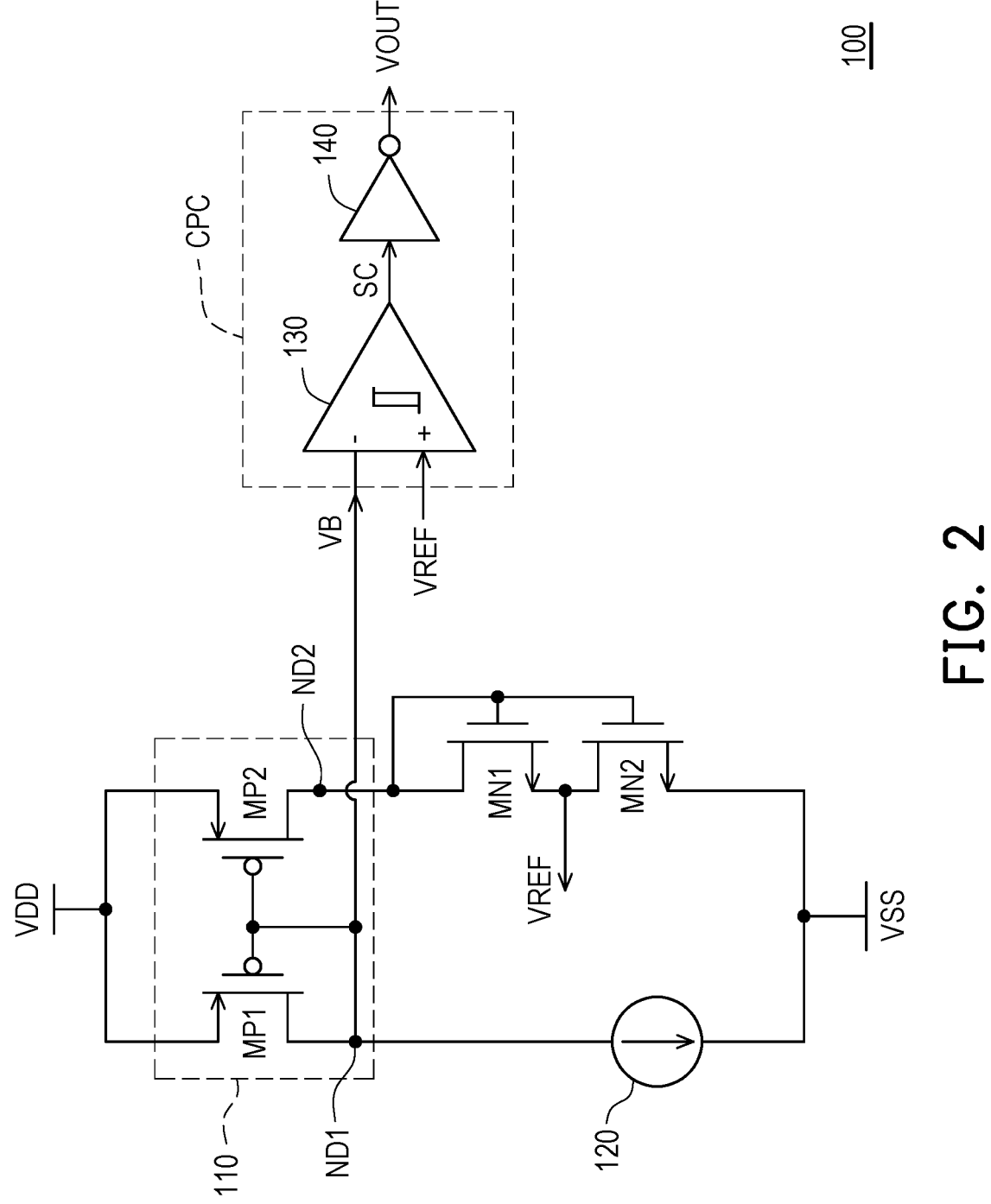
FIG. 2 is a schematic circuit diagram of an undervoltage-lockout circuit according to an embodiment of the disclosure.

Referring to FIG. 2, FIG. 2 is a schematic circuit diagram of an undervoltage-lockout circuit according to an embodiment of the disclosure. An undervoltage-lockout circuit 100 may determine whether to stop an operation of an electronic circuit according to a voltage value of a system high voltage VDD of the electronic circuit. In this embodiment, the undervoltage-lockout circuit 100 includes a current mirror circuit 110, a current source 120, reference transistors MN1 and MN2, and a comparison circuit CPC. The current mirror circuit 110 is coupled to the system high voltage VDD. The current mirror circuit 110 includes a first connection terminal ND1 and a second connection terminal ND2. The current source 120 is coupled to the first connection terminal ND1. The current source 120 may provide a constant current value. A first terminal of the reference transistor MN1 is coupled to the second connection terminal ND2. A second terminal of the reference transistor MN1 provides a reference voltage VREF. A first terminal of the reference transistor MN2 is coupled to a second terminal of the reference transistor MN1. A second terminal of the reference transistor MN2 is coupled to a system low voltage VSS (for example, a ground voltage).

In this embodiment, the comparison circuit CPC is coupled to the second terminal of the reference transistor MN1 and the first connection terminal ND1. The comparison circuit CPC receives an input voltage VB located at the first connection terminal ND1 and the reference voltage VREF. The comparison circuit CPC generates an undervoltage-lockout signal VOUT according to the input voltage VB and the reference voltage VREF.

It is worth mentioning that the undervoltage-lockout circuit 100 generates the undervoltage-lockout signal VOUT according to the input voltage VB located at the first connection terminal ND1 and the reference voltage VREF located at the second terminal of the reference transistor MN1. It should be noted that the undervoltage-lockout circuit 100 provides the input voltage VB corresponding to the system high voltage VDD by the current mirror circuit 110 and the current source 120. Therefore, the undervoltage-lockout circuit 100 does not need to divide the system high voltage VDD by multiple resistors to generate the input voltage VB. In this way, a layout area and power consumption of the undervoltage-lockout circuit 100 may be greatly reduced.

In this embodiment, the current mirror circuit 110 further includes current mirror transistors MP1 and MP2. A first terminal of the current mirror transistor MP1 is coupled to the system high voltage VDD. A second terminal of the current mirror transistor MP1 is coupled to the first connection terminal ND1 and a control terminal of the current mirror transistor MP1. A first terminal of the current mirror transistor MP2 is coupled to the system high voltage VDD. A second terminal of the current mirror transistor MP2 is coupled to the second connection terminal ND2. A control terminal of the current mirror transistor MP2 is coupled to first connection terminal ND1.

In this embodiment, the current mirror transistors MP1 and MP2 may be implemented by P-type transistors respectively. The reference transistors MN1 and MN2 may be implemented by N-type transistors respectively.

In this embodiment, a control terminal of the reference transistor MN1 and a control terminal of the reference transistor MN2 are coupled to the second connection terminal ND2. It can be seen that, based on the coupling of the reference transistors MN1 and MN2, the reference transistor MN1 works in a weak inversion region, and the reference transistor MN2 works in a linear region. Therefore, the reference transistors MN1 and MN2 operate based on a sub-threshold current of the reference transistor MN1. In this way, the reference transistors MN1 and MN2 have very low power consumption.

In addition, the reference voltage VREF is provided by the undervoltage-lockout circuit 100 itself. In other words, the undervoltage-lockout circuit 100 does not need to receive the reference voltage from the outside through a connection port.

To further illustrate, the voltage value of the reference voltage VREF may be determined based on a critical voltage value of the reference transistor MN1 and a critical voltage value of the reference transistor MN2. Furthermore, the reference voltage VREF may be determined by Formula (1), Formula (2), and Formula (3).

$$VREF = (Vth1 - Vth2)VT \times \ln(S1/S2) \qquad \text{Formula (1)}$$

$$S1 = (W1/L1) \times Cox1 \qquad \text{Formula (2)}$$

$$S2 = (W2/L2) \times Cox2 \qquad \text{Formula (3)}$$

"Vth1" is the critical voltage value of the reference transistor MN1. "Vth2" is the critical voltage value of the reference transistor MN2. "VT" is a thermal voltage, about 0.026 volts. "S1" refers to an S parameter of the reference transistor MN1. "S2" refers to an S parameter of the reference transistor MN2. "L1" is a channel length of the reference transistor MN1. "W1" is a channel width of the reference transistor MN1. "Cox1" is a capacitance value of a gate oxide layer of the reference transistor MN1. "L2" is a channel length of the reference transistor MN2. "W2" is a channel width of the reference transistor MN2. "Cox2" is a capacitance value of a gate oxide layer of the reference transistor MN2. In addition, "ln(S1/S2)" is a natural logarithm of S1 divided by S2.

It should be noted that, from Formula (1), since the difference (that is, Vth1−Vth2) between the critical voltage value Vth1 of the reference transistor MN1 and the critical voltage value Vth2 of the reference transistor MN2 is a fixed value and less variable with temperature. Therefore, the reference voltage VREF is less affected by the change in temperature.

In this embodiment, the comparison circuit CPC includes a comparator 130 and an inverting circuit 140. The comparator 130 is coupled to the second terminal of the reference transistor MN1 and the first connection terminal ND1. The comparator 130 compares the input voltage VB with the reference voltage VREF to generate a comparison signal SC. Taking this embodiment as an example, an inverting input terminal of the comparator 130 is coupled to the first connection terminal ND1. The comparator 130 receives the input voltage VB by the inverting input terminal. A non-inverting input terminal of the comparator 130 is coupled to the second terminal of the reference transistor MN1. The comparator 130 receives the reference voltage VREF by the non-inverting input terminal.

The inverting circuit 140 is coupled to the comparator 130. The inverting circuit 140 generates the undervoltage-lockout signal VOUT according to the comparison signal SC. Taking this embodiment as an example, the input terminal of the inverting circuit 140 receives the comparison signal SC. The inverting circuit 140 performs an inverting operation on the comparison signal SC to generate the undervoltage-lockout signal VOUT.

Figure 3:
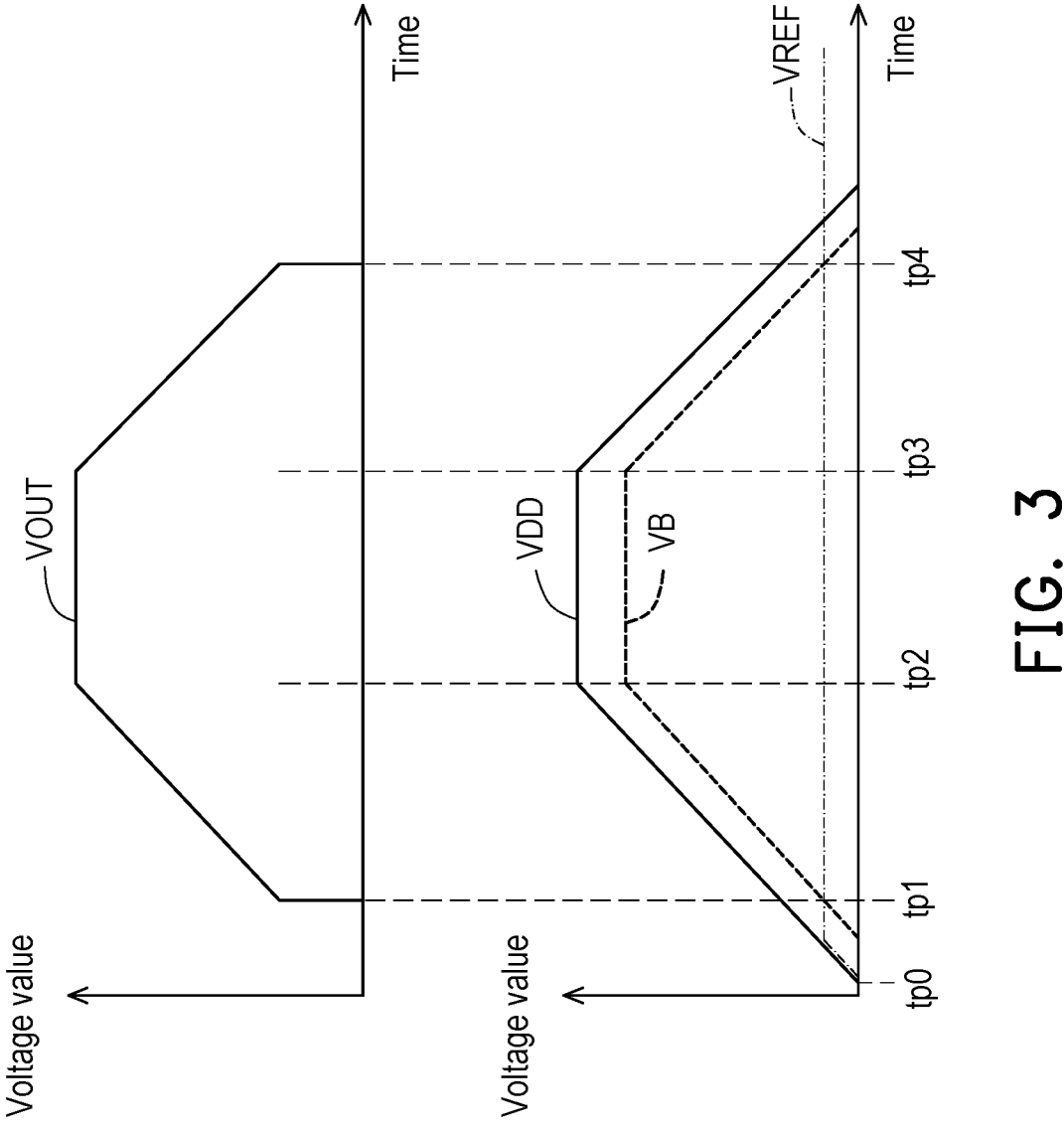
FIG. 3 is a schematic signal diagram according to an embodiment of the disclosure.

Referring to FIG. 2 and FIG. 3, FIG. 3 is a schematic signal diagram according to an embodiment of the disclosure. In this embodiment, at a time point tp0, the voltage value of the system high voltage VDD of the electronic circuit begins to rise. After the time point tp0, the undervoltage-lockout circuit 100 starts operating. Therefore, the reference voltage VREF and the input voltage VB are generated. The voltage value of the input voltage VB changes as the voltage value of the system high voltage VDD changes. Based on the current mirror circuit 110 and the current source 120, there is approximately a voltage difference value between the voltage value of the input voltage VB and the voltage value of the system high voltage VDD.

Between the time point tp0 and a time point tp2, the voltage value of the system high voltage VDD gradually rises. The voltage value of the input voltage VB gradually rises. However, between the time point tp0 and a time point tp1, the voltage value of the input voltage VB is lower than the voltage value of the reference voltage VREF. The comparator 130 provides the comparison signal SC with a high voltage level. Therefore, the inverting circuit 140 provides the undervoltage-lockout signal VOUT with a low voltage level. The undervoltage-lockout signal VOUT with the low voltage level stops the electronic circuit from operating.

After the time point tp1, the voltage value of the input voltage VB is higher than the voltage value of the reference voltage VREF. The comparator 130 provides the comparison signal SC with a low voltage level. Therefore, the inverting circuit 140 provides the undervoltage-lockout signal VOUT with a high voltage level. The undervoltage-lockout signal VOUT with the high voltage level enables electronic circuit to operate. In this embodiment, in a case where the voltage value of the input voltage VB is higher than the voltage value of the reference voltage VREF, the voltage value of the undervoltage-lockout signal VOUT may follow the voltage values of the input voltage VB and the system high voltage VDD.

In some embodiments, in the case where the voltage value of the input voltage VB is higher than the voltage value of the reference voltage VREF, the voltage value of the undervoltage-lockout signal VOUT may be a fixed voltage value.

Between the time point tp2 and a time point tp3, the voltage value of the system high voltage VDD is stable. Therefore, the voltage value of the input voltage VB is also stable.

After the time point tp3, the voltage value of the system high voltage VDD begins to decrease. The voltage value of the input voltage VB also begins to decrease. Between the time point tp3 and a time point tp4, the voltage value of the input voltage VB is still higher than the voltage value of the reference voltage VREF. The comparator 130 provides the comparison signal SC with the low voltage level. Therefore, the inverting circuit 140 provides the undervoltage-lockout signal VOUT with the high voltage level.

After the time point tp4, the voltage value of the system high voltage VDD drops below the voltage value of the reference voltage VREF. Therefore, the comparator 130 provides the comparison signal SC with the high voltage level. Therefore, the inverting circuit 140 provides the undervoltage-lockout signal VOUT with the low voltage level.

In this embodiment, the comparator 130 is a comparator with a hysteresis function. Therefore, when the voltage value of the input voltage VB oscillates at the voltage value of the reference voltage VREF, the comparator 130 may slow down the oscillation of the comparison signal SC between the high voltage level and the low voltage level.

In some embodiments, the comparator 130 receives the input voltage VB by the non-inverting input terminal. The comparator 130 receives the reference voltage VREF by the inverting input terminal. Therefore, in some embodiments, the inverting circuit 140 may be omitted.

Figure 4:
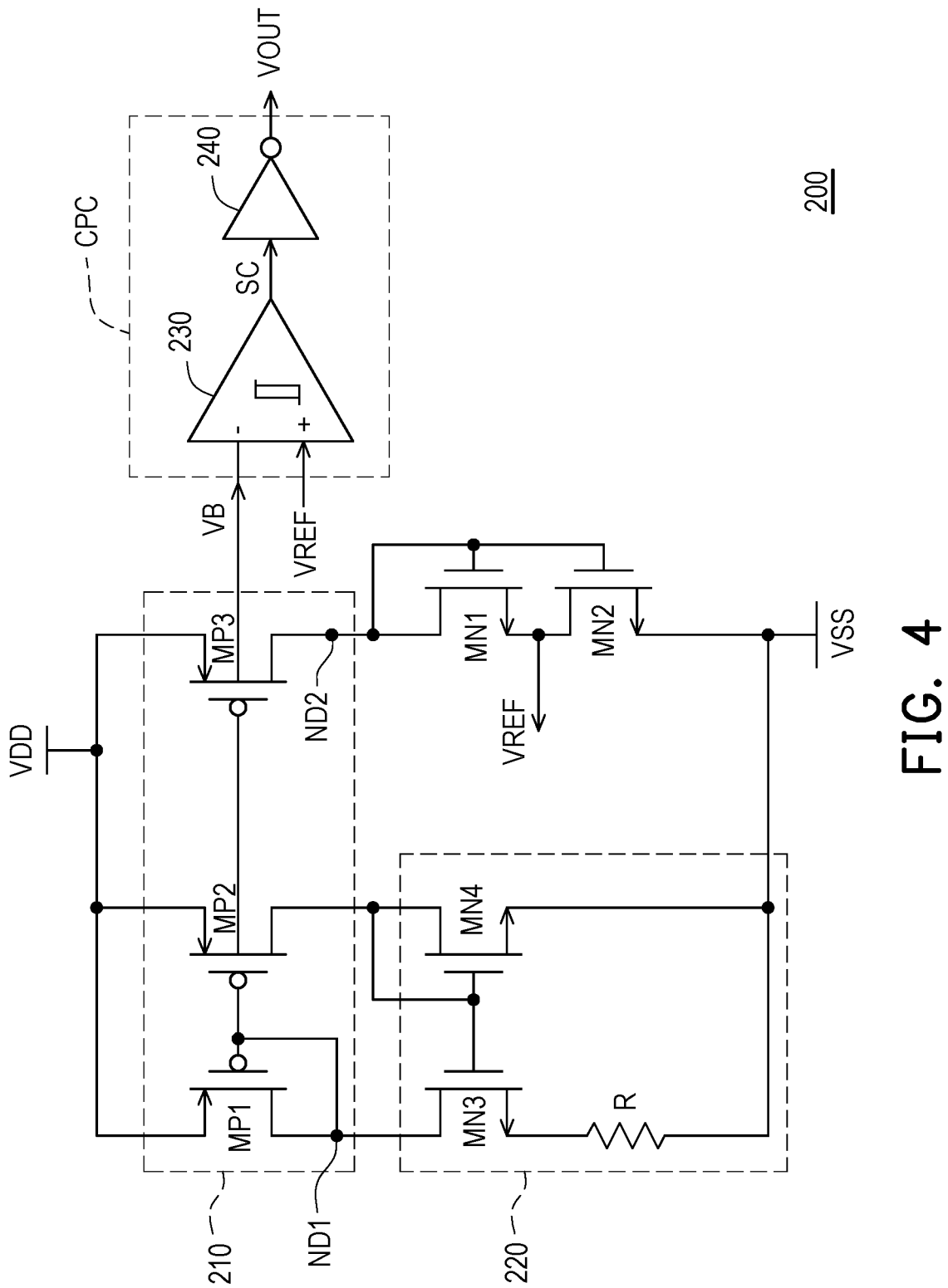
FIG. 4 is a schematic circuit diagram of an undervoltage-lockout circuit according to an embodiment of the disclosure.

Referring to FIG. 4, FIG. 4 is a schematic circuit diagram of an undervoltage-lockout circuit according to an embodiment of the disclosure. In this embodiment, an undervoltage-lockout circuit 200 includes a current mirror circuit 210, a current source 220, the reference transistors MN1 and MN2, and the comparison circuit CPC. The current mirror circuit 210 includes the first connection terminal ND1, the second connection terminal ND2, and current mirror transistors MP1, MP2, and MP3. The first terminal of the current mirror transistor MP1 is coupled to the system high voltage VDD. The second terminal of the current mirror transistor MP1 is coupled to the first connection terminal ND1 and the control terminal of the current mirror transistor MP1. The first terminal of the current mirror transistor MP2 is coupled to the system high voltage VDD. The second terminal of the current mirror transistor MP2 is coupled to current source 220. The control terminal of the current mirror transistor MP2 is coupled to the first connection terminal ND1. A first terminal of the current mirror transistor MP3 is coupled to the system high voltage VDD. A second terminal of the current mirror transistor MP3 is coupled to the second connection terminal ND2. A control terminal of the current mirror transistor MP3 is coupled to the first connection terminal ND1.

In this embodiment, the current source 220 includes current source transistors MN3, MN4 and a resistor R. A first terminal of the current source transistor MN3 is coupled to the first connection terminal ND1. A control terminal of the current source transistor MN3 is coupled to the second terminal of the current mirror transistor MP2. The resistor R is coupled between a second terminal of the current source transistor MN3 and the system low voltage VSS. A first terminal of the current source transistor MN4 is coupled to the second terminal of the current mirror transistor MP2. The control terminal of the current source transistor MN3 and a control terminal of the current source transistor MN4. A second terminal of the current source transistor MN4 is coupled to the system low voltage VSS.

In this embodiment, the first terminal of the reference transistor MN1 is coupled to the second connection terminal ND2. The second terminal of the reference transistor MN1 provides the reference voltage VREF. The control terminal of the reference transistor MN1 is coupled to the second connection terminal ND2. The first terminal of the reference transistor MN2 is coupled to the second terminal of the reference transistor MN1. The second terminal of the reference transistor MN2 is coupled to the system low voltage VSS. The control terminal of the reference transistor MN2 is coupled to the second connection terminal ND2. The reference transistor MN1 works in the weak inversion region. The reference transistor MN2 works in the linear region.

In this embodiment, the current mirror transistors MP1 and MP2 and the current source transistors MN3 and MN4 may form a stacked current mirror. Therefore, the voltage value of the input voltage VB may accurately follow the voltage value of the system high voltage VDD.

In this embodiment, the comparison circuit CPC includes a comparator 230 and an inverting circuit 240. The implementation of the comparator 230 and the inverting circuit 240 is substantially the same as the implementation of the comparator 130 and the inverting circuit 140 shown in FIG. 2, and is not repeated here again.

In this embodiment, the current mirror transistors MP1, MP2, and MP3 may be respectively implemented by P-type transistors. The reference transistors MN1 and MN2 and the current source transistors MN3 and MN4 may be implemented by N-type transistors respectively.

Figure 5:
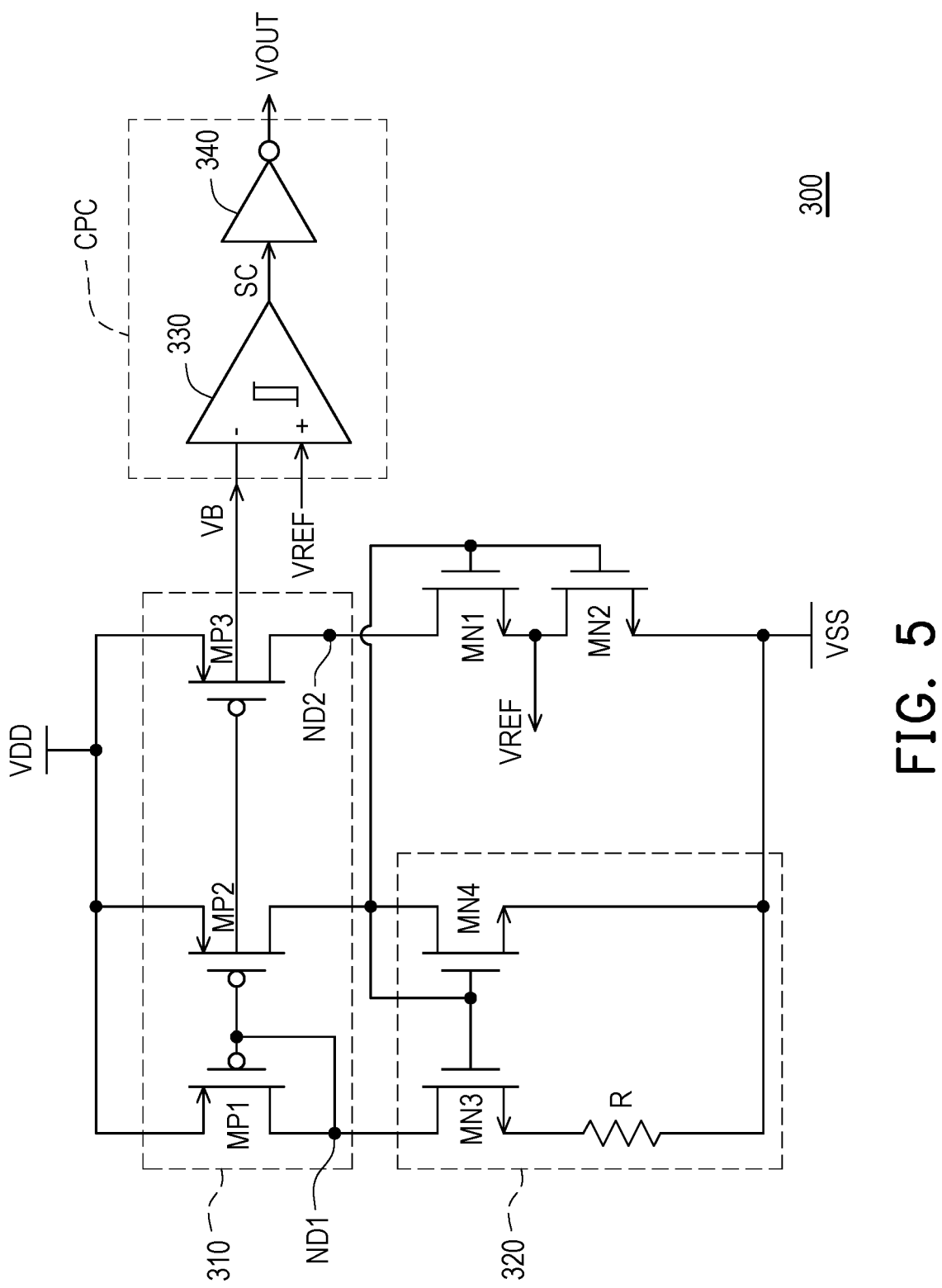
FIG. 5 is a schematic circuit diagram of an undervoltage-lockout circuit according to an embodiment of the disclosure.

Referring to FIG. 5, FIG. 5 is a schematic circuit diagram of an undervoltage-lockout circuit according to an embodiment of the disclosure. In this embodiment, an undervoltage-lockout circuit 300 includes a current mirror circuit 310, a current source 320, the reference transistors MN1 and MN2, and the comparison circuit CPC. The current mirror circuit 310 includes a first connection terminal ND1, a second connection terminal ND2, and current mirror transistors MP1. MP2, and MP3. The current source 320 includes the current source transistors MN3, MN4, and the resistor R. The comparison circuit CPC includes a comparator 330 and an inverting circuit 340. The implementation of the current mirror circuit 310, the current source 320, and the comparison circuit CPC is substantially the same as the implementation of the current mirror circuit 210, the current source 220, and the comparison circuit CPC as shown in FIG. 3, and is not repeated here again.

In this embodiment, the first terminal of the reference transistor MN1 is coupled to the second connection terminal ND2. The second terminal of the reference transistor MN1 provides the reference voltage VREF. The control terminal of the reference transistor MN1 is coupled to the second terminal of the current mirror transistor MP2. The first terminal of the reference transistor MN2 is coupled to the second terminal of the reference transistor MN1. The second terminal of the reference transistor MN2 is coupled to the system low voltage VSS. The control terminal of the reference transistor MN2 is coupled to the second terminal of the current mirror transistor MP2. The reference transistor MN1 works in the weak inversion region. The reference transistor MN2 works in the linear region.

To sum up, the undervoltage-lockout circuit of the disclosure generates the undervoltage-lockout signal according to the input voltage located at the first connection terminal and the reference voltage located at the second terminal of the first reference transistor. It should be noted that the undervoltage-lockout circuit provides the input voltage corresponding to the system high voltage by the current mirror circuit and the current source. Therefore, the undervoltage-lockout circuit does not need to divide the system high voltage by the multiple resistors to generate the input voltage. In this way, the layout area and power consumption of the undervoltage-lockout circuit may be greatly reduced. In addition, the reference voltage is provided by the undervoltage-lockout circuit itself. In this way, the undervoltage-lockout circuit does not need to receive the reference voltage from the outside through the connection port.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:
1. An undervoltage-lockout circuit, comprising:
a current mirror circuit, coupled to a system high voltage, and comprising a first connection terminal and a second connection terminal;
a current source, coupled to the first connection terminal;
a first reference transistor, wherein a first terminal of the first reference transistor is coupled to the second connection terminal, and a second terminal of the first reference transistor provides a reference voltage;

a second reference transistor, wherein a first terminal of the second reference transistor is coupled to the second terminal of the first reference transistor, and a second terminal of the second reference transistor is coupled to a system low voltage; and
a comparison circuit, coupled to the second terminal of the first reference transistor and the first connection terminal, configured to receive an input voltage at the first connection terminal and the reference voltage, and generating an undervoltage-lockout signal according to the input voltage and the reference voltage.

2. The undervoltage-lockout circuit according to claim 1, wherein:
each of the first reference transistor and the second reference transistor is implemented by N-type MOS FET,
the first reference transistor works in a weak inversion region, and
the second reference transistor works in a linear region.

3. The undervoltage-lockout circuit according to claim 1, wherein a voltage value of the reference voltage is determined based on a threshold voltage value of the first reference transistor and a threshold voltage value of the second reference transistor.

4. The undervoltage-lockout circuit according to claim 1, wherein the current mirror circuit further comprises:
a first current mirror transistor, wherein a first terminal of the first current mirror transistor is coupled to the system high voltage, and a second terminal of the first current mirror transistor is coupled to the first connection terminal and a control terminal of the first current mirror transistor; and
a second current mirror transistor, wherein a first terminal of the second current mirror transistor is coupled to the system high voltage, a second terminal of the second current mirror transistor is coupled to the second connection terminal, and a control terminal of the second current mirror transistor is coupled to the first connection terminal.

5. The undervoltage-lockout circuit according to claim 4, wherein a control terminal of the first reference transistor and a control terminal of the second reference transistor are coupled to the second connection terminal.

6. The undervoltage-lockout circuit according to claim 1, wherein the current mirror circuit further comprises:
a first current mirror transistor, wherein a first terminal of the first current mirror transistor is coupled to the system high voltage, and a second terminal of the first current mirror transistor is coupled to the first connection terminal and the first current mirror transistor;
a second current mirror transistor, wherein a first terminal of the second current mirror transistor is coupled to the system high voltage, a second terminal of the second current mirror transistor is coupled to the current source, and a control terminal of the second current mirror transistor is coupled to the first connection terminal; and
a third current mirror transistor, wherein a first terminal of the third current mirror transistor is coupled to the system high voltage, a second terminal of the third current mirror transistor is coupled to the second connection terminal, and a control terminal of the third current mirror transistor coupled to the first connection terminal.

7. The undervoltage-lockout circuit according to claim 6, wherein a control terminal of the first reference transistor and a control terminal of the second reference transistor are coupled to the second connection terminal.

8. The undervoltage-lockout circuit according to claim 6, wherein the current source comprises:

a first current source transistor, wherein a first terminal of the first current source transistor is coupled to the first connection terminal, and a control terminal of the first current source transistor is coupled to the second terminal of the second current mirror transistor;

a resistor, coupled between a second terminal of the first current source transistor and the system low voltage; and a second current source transistor, wherein a first terminal of the second current source transistor is coupled to the second terminal of the second current mirror transistor, the control terminal of the first current source transistor, and the control terminal of the second current source transistor, and a second terminal of the second current source transistor is coupled to the system low voltage.

9. The undervoltage-lockout circuit according to claim 8, wherein a control terminal of the first reference transistor and a control terminal of the second reference transistor are coupled to the second terminal of the second current mirror transistor.

10. The undervoltage-lockout circuit according to claim 1, wherein the comparison circuit comprises:

a comparator, coupled to the second terminal of the first reference transistor and the first connection terminal, and configured to compare the input voltage with the reference voltage to generate a comparison signal; and an inverting circuit, coupled to the comparator, and configured to generate the undervoltage-lockout signal according to the comparison signal.

\* \* \* \* \*